(12) United States Patent
Konopacki

(10) Patent No.: US 7,278,408 B1
(45) Date of Patent: Oct. 9, 2007

(54) RETURNLESS FUEL SYSTEM MODULE

(75) Inventor: Jeffery M. Konopacki, Ripon, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 11/290,013

(22) Filed: Nov. 30, 2005

(51) Int. Cl.
*F02M 15/00* (2006.01)

(52) U.S. Cl. .................. 123/541; 123/509; 123/41.31; 123/510; 440/88 R

(58) Field of Classification Search ............... 123/510, 123/509, 541, 41.31, 516, 463, 514; 440/88, 440/88 R
See application file for complete search history.

(56) References Cited

U.S. PATENT DOCUMENTS

| | | | | |
|---|---|---|---|---|
| 2,432,475 | A | * 12/1947 | Griffith | 210/183 |
| 2,791,186 | A | * 5/1957 | Alden | 417/228 |
| 3,835,822 | A | * 9/1974 | Mickle et al. | 123/41.31 |
| 5,647,331 | A | * 7/1997 | Swanson | 123/516 |
| 5,832,903 | A | 11/1998 | White et al. | |
| 5,887,555 | A | * 3/1999 | Schmitz | 123/41.31 |
| 5,908,020 | A | * 6/1999 | Boutwell et al. | 123/541 |
| 5,964,206 | A | 10/1999 | White et al. | |
| 6,009,859 | A | * 1/2000 | Roche et al. | 123/509 |
| 6,322,410 | B1 | * 11/2001 | Harvey | 440/88 R |
| 6,397,822 | B1 | * 6/2002 | Ulm et al. | 123/509 |
| 6,428,375 | B2 | * 8/2002 | Takayanagi | 440/88 R |
| 6,457,460 | B1 | * 10/2002 | Doane et al. | 123/541 |
| 6,581,579 | B1 | 6/2003 | Knight et al. | |
| 6,715,471 | B2 | * 4/2004 | Hiraiwa et al. | 123/497 |
| 6,923,165 | B1 | 8/2005 | Draves et al. | |

OTHER PUBLICATIONS

Cengel, Y. Heat Transfer: A Practical Approach, 2003 McGraw Hill, Second Edition, p. 694.*

* cited by examiner

*Primary Examiner*—Stephen K. Cronin
*Assistant Examiner*—J. Page Hufty
(74) *Attorney, Agent, or Firm*—Andrus, Sceales, Starke & Sawall, LLP

(57) ABSTRACT

A returnless fuel system module includes a fuel pump in a fuel pump cavity, a fuel pressure regulator in a fuel pressure regulator cavity, first and second transfer passages therebetween, and a heat exchanger integrally formed in the housing in thermally conductive relation with at least the bypass relief passage.

3 Claims, 2 Drawing Sheets

RETURNLESS FUEL SYSTEM MODULE

BACKGROUND AND SUMMARY

The invention relates to fuel systems, and more particularly returnless fuel systems.

In a return-type fuel system, a fuel pump is typically provided in a fuel tank for cooling thereby and pumps fuel to an internal combustion engine. A fuel pressure regulator regulates the fuel pressure by controlling the amount of fuel returned through a bypass relief passage to the fuel pump in the fuel tank.

In a returnless fuel system, the fuel pump pumps fuel from a remote fuel tank, and the fuel pressure regulator returns fuel through the bypass relief passage to the pump, not to the fuel tank.

The present invention relates to returnless fuel systems.

DETAILED DESCRIPTION

Figure 1:
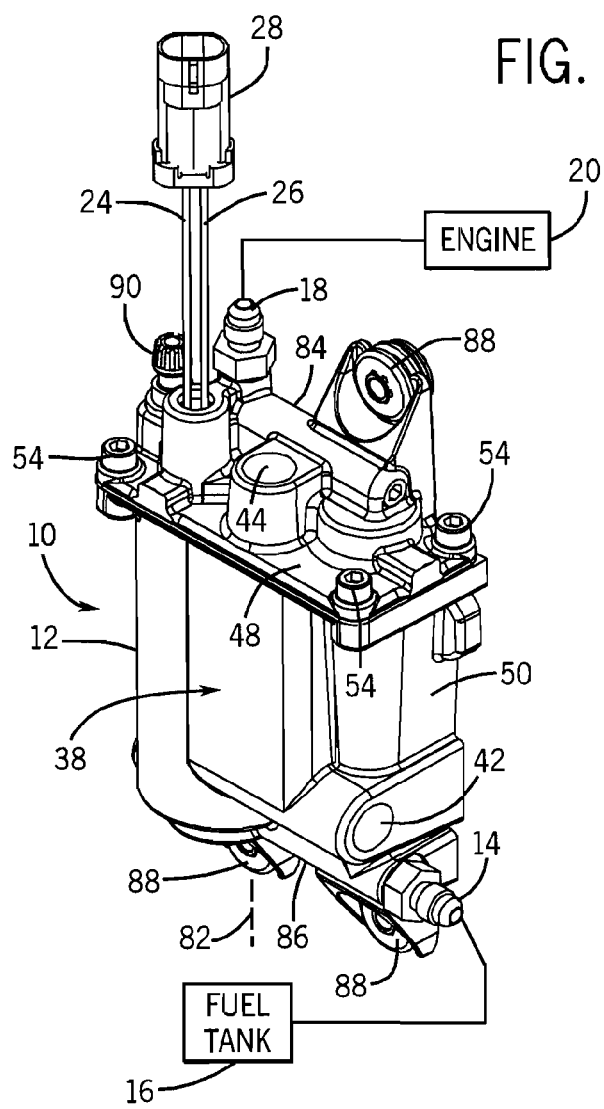
FIG. 1 is a perspective view of a returnless fuel system module in accordance with the invention.
Figure 2:
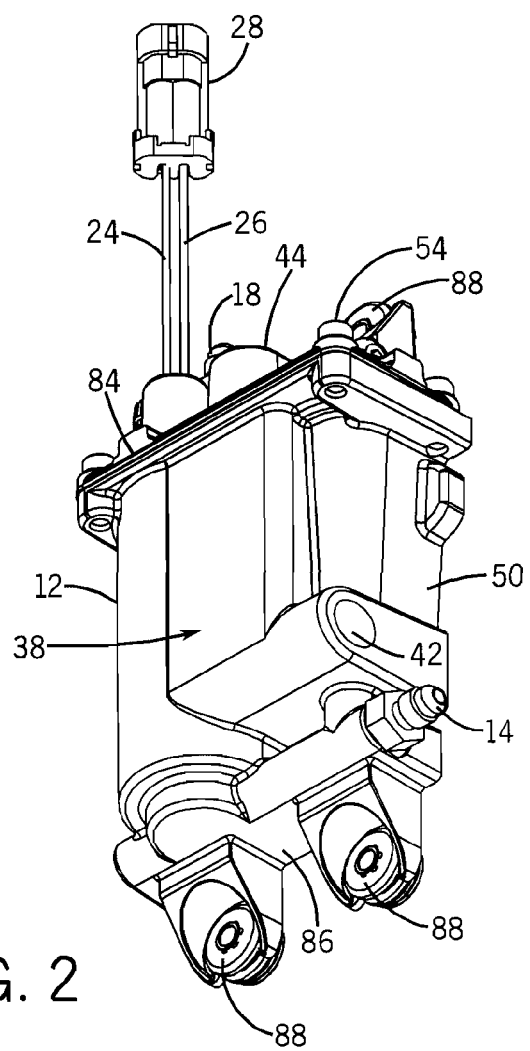
FIG. 2 is another perspective view of the module of FIG. 1.
Figure 3:
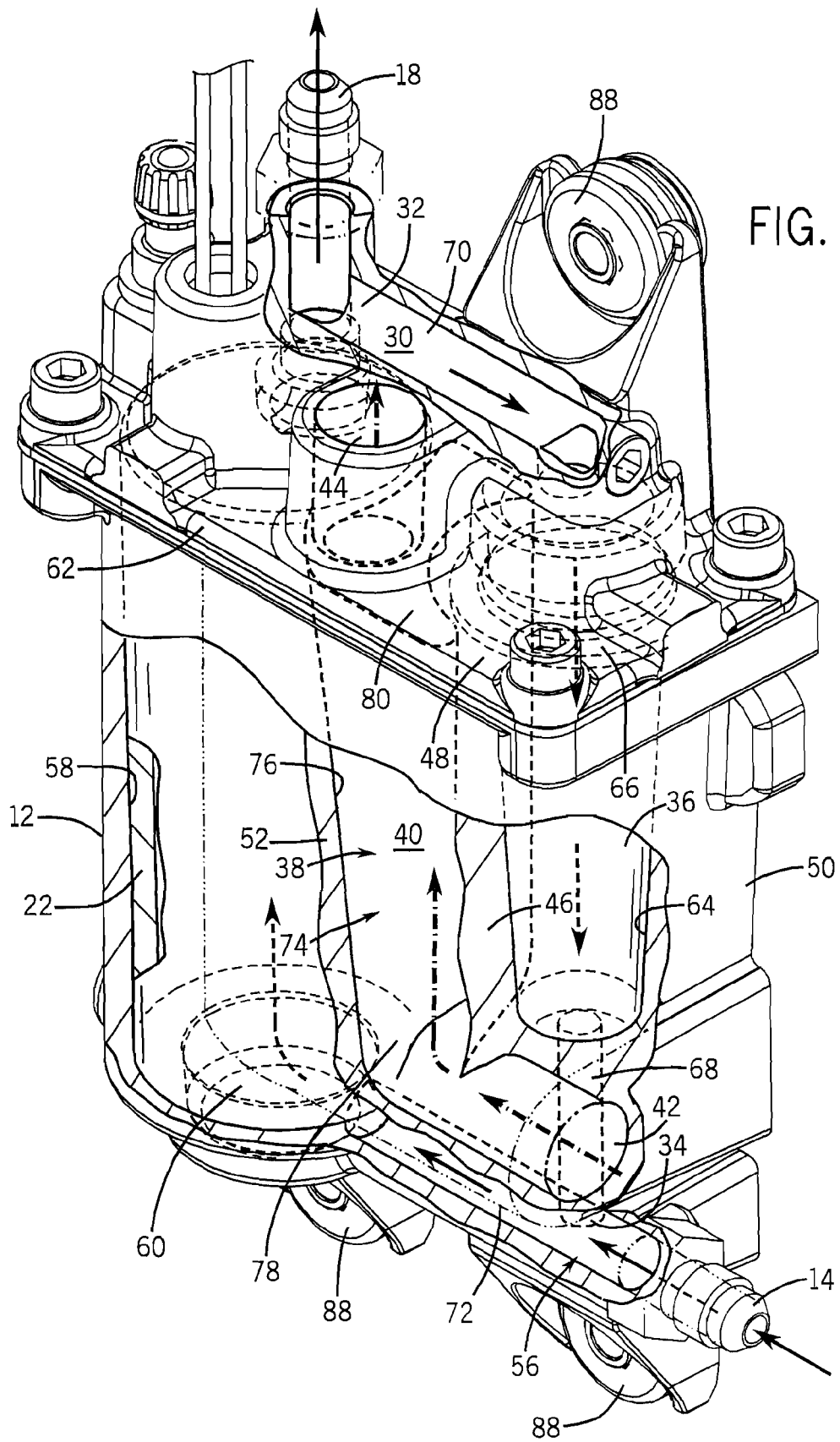
FIG. 3 is an enlarged partially cut away view of the module of FIG. 1.

FIGS. 1-3 show a returnless fuel system module 10 including a housing 12 having a fuel inlet 14 receiving fuel from a remote fuel tank 16, and a fuel outlet 18 delivering fuel to an internal combustion engine 20. A fuel pump 22 in the housing pumps fuel from fuel inlet 14 to fuel outlet 18 as commanded by electrical signals on conductors 24, 26 connected by plug or socket 28 to the ECU (engine control unit), not shown. The fuel pump is known in the prior art. A bypass relief passage 30 in the housing has a bypass inlet 32 at fuel outlet 18, and has a bypass outlet 34 at fuel inlet 14. A fuel pressure regulator 36 in the housing controls the amount of fuel returned through bypass relief passage 30 to fuel inlet 14 from fuel outlet 18, to regulate fuel pressure at fuel outlet 18. The pressure regulator is known in the prior art. The returned fuel flowing through bypass relief passage 30 from fuel outlet 18 is returned to fuel inlet 14 without returning to fuel tank 16, thus providing the noted returnless fuel system. Returnless fuel systems induce heat into the fuel as the pumping takes place, and hence it is desirable to cool the fuel to prevent vaporization of the fuel. It is known in the prior art to utilize an external heat exchanger to cool the fuel after it is pumped to system pressure and relieved back to the inlet of the pump.

In the present system, a heat exchanger 38 is formed integrally in housing 12 in thermally conductive relation with bypass relief passage 30 to cool fuel therein, to minimize vaporization of fuel including fuel returned to the fuel pump and re-pumped thereby. The heat exchanger is preferably provided by a coolant passage 40 in the housing and having a coolant inlet 42 and a coolant outlet 44 and passing coolant therethrough, e.g. seawater as pumped by a water pump, not shown, or other source of coolant. The housing has a sidewall 46 between and separating the bypass relief passage and the coolant passage, which sidewall is thermally conductive and transfers heat from fuel in the bypass relief passage to coolant in the coolant passage. Heat is particularly generated where there is a drop in pressure across the regulator, i.e. where the hydraulic energy is released, going from a high pressure zone in the upper housing casting 48 to a low pressure zone in the lower housing casting 50. The coolant passage is strategically placed in proximity to such pressure-dropping heat-generating zone. The housing has a sidewall 52 between and separating the fuel pump and the coolant passage, with such sidewall 52 being thermally conductive and transferring heat from the fuel pump to coolant in the coolant passage. The housing 12, including upper and lower sections 48 and 50, is preferably aluminum, and such housing sections are mounted to each other by allen bolts such as 54.

Housing 12 has a fuel circuit 56 therethrough through which fuel flows in a loop, including a fuel pump cavity 58 containing the fuel pump and having an inlet end 60 and an outlet end 62, a fuel pressure regulator cavity 64 containing the fuel pressure regulator and having an inlet end 66 and an outlet end 68, a first transfer passage 70 between outlet end 62 of fuel pump cavity 58 and inlet end 66 of fuel pressure regulator cavity 64, and a second transfer passage 72 between outlet end 68 of fuel pressure regulator cavity 64 and inlet end 60 of fuel pump cavity 58. Fuel pump cavity 58 and transfer passage 70 and fuel pressure regulator cavity 64 and transfer passage 72 are in series and define the noted loop 56. Such loop circumscribes a middle region 74 of the housing having the heat exchanger integrally formed therein. Middle region 74 of the housing is circumscribed by loop 56 and has an interior coolant cavity 76 in the housing and having a coolant inlet 78 and a coolant outlet 80 and passing coolant therethrough and providing the noted heat exchanger 38.

Housing 12 extends axially along an axis 82 between first and second axially distally opposite axial ends 84 and 86. Fuel pump cavity 58 and fuel pressure regulator cavity 64 extend axially between the respective noted inlet and outlet ends and are laterally spaced by coolant cavity 76 therebetween. Fuel outlet 18, outlet end 62 of fuel pump cavity 58, transfer passage 70, and inlet end 66 of fuel pressure regulator cavity 64 are at the noted first axial end 84 of the housing. Fuel inlet 14, inlet end 60 of fuel pump cavity 58, transfer passage 72, and outlet end 68 of fuel pressure regulator cavity 64 are at the noted second axial end 86 of the housing. Coolant cavity 76 extends axially between inlet and outlet ends 78 and 80. Outlet end 80 of coolant cavity 76 is at the noted first axial end 84 of the housing adjacent transfer passage 70. Inlet end 78 of coolant cavity 76 is at the noted second axial end 86 of the housing adjacent transfer passage 72. Coolant cavity 76 is laterally spaced between fuel pressure regulator cavity 64 and fuel pump cavity 58 by the noted respective first and second axially extending sidewalls 46 and 52. Axially extending coolant cavity 76 and the noted first axially extending sidewall 46 extend along the entire length of and then beyond fuel pressure regulator cavity 64, to maximize heat transfer from returned fuel in fuel pressure regulator cavity 64 to coolant in coolant cavity 76, including from the noted pressure-drop heat-generating zone. The housing is mounted to the engine block or to some other location in the engine compartment by grommets such as 88. A schraeder valve 90 may be provided for testing cavity pressure during manufacture, which valve is then sealed-off, as is known.

It is recognized that various equivalents, alternatives and modifications are possible within the scope of the appended claims.

What is claimed is:

1. A returnless fuel system module comprising:

a housing having a fuel inlet receiving fuel from a remote fuel tank, and a fuel outlet delivering fuel to an internal combustion engine;

a fuel pump in said housing pumping fuel from said fuel inlet to said fuel outlet;

a bypass relief passage in said housing and having a bypass inlet at said fuel outlet, and having a bypass outlet at said fuel inlet;

a fuel pressure regulator in said housing and controlling the amount of fuel returned through said bypass relief passage to said fuel inlet from said fuel outlet, to regulate fuel pressure at said fuel outlet, said returned fuel flowing through said bypass relief passage from said fuel outlet being returned to said fuel inlet without returning to said fuel tank, thus providing said returnless fuel system;

a heat exchanger formed integrally in said housing in thermally conductive relation with said bypass relief passage to cool fuel therein, to minimize vaporization of fuel including fuel returned to said fuel pump and re-pumped thereby;

wherein said housing has a fuel circuit therethrough through which fuel flows in a loop, comprising:

a fuel pump cavity containing said fuel pump and having an inlet end and an outlet end;

a fuel pressure regulator cavity containing said fuel pressure regulator and having an inlet end and an outlet end;

a first transfer passage between said outlet end of said fuel pump cavity and said inlet end of said fuel pressure regulator cavity;

a second transfer passage between said outlet end of said fuel pressure regulator cavity and said inlet end of said fuel pump cavity;

wherein:

fuel flows from said remote fuel tank to said fuel inlet then through second transfer passage then to said inlet end of said fuel pump cavity;

said housing extends axially along an axis between first and second axially distally opposite axial ends;

said fuel inlet, said inlet end of said fuel pump cavity, said second transfer passage, and said outlet end of said fuel pressure regulator cavity are all at said second axial end of said housing;

said loop circumscribes a middle region of said housing having said heat exchanger integrally formed therein;

said middle region of said housing circumscribed by said loop comprises an interior coolant cavity in said housing having a coolant inlet and a coolant outlet and passing coolant therethrough and providing said heat exchanger;

said heat exchanger having a flow of coolant defined in said middle region wherein said flow of coolant flows axially between said coolant inlet and said coolant outlet.

2. The returnless fuel system module according to claim 1 wherein:

said fuel pump cavity and said first transfer passage and said fuel pressure regulator cavity and said second transfer passage are in series and define said loop;

said fuel pump cavity and said fuel pressure regulator cavity extend axially between respective said inlet and outlet ends and are laterally spaced by said coolant cavity therebetween;

said fuel outlet, said outlet end of said fuel pump cavity, said first transfer passage, and said inlet end of said fuel pressure regulator cavity are all at said first axial end of said housing;

said coolant cavity extends axially between said inlet and outlet ends, one of said inlet and outlet ends of said coolant cavity is at said first axial end of said housing adjacent said first transfer passage, the other of said inlet and outlet ends of said coolant cavity is at said second axial end of said housing adjacent said second transfer passage.

3. The returnless fuel system module according to claim 1 wherein:

said fuel pump cavity and said first transfer passage and said fuel pressure regulator cavity and said second transfer passage are in series and define said loop;

said fuel pressure regulator is connected in series in said loop, and said fuel pressure regulator passes fuel serially therethrough from said inlet end of said fuel pressure regulator cavity to said outlet end of said fuel pressure regulator cavity.

* * * * *